(12) United States Patent
Horton et al.

(10) Patent No.: US 12,463,941 B2
(45) Date of Patent: Nov. 4, 2025

(54) PROVIDING A NETWORK FIREWALL BETWEEN A VIRTUALIZED ENVIRONMENT AND A HOST PROCESSING SYSTEM

(71) Applicant: MICROSOFT TECHNOLOGY LICENSING, LLC, Redmond, WA (US)

(72) Inventors: Keith Edgar Horton, North Bend, WA (US); Alan Thomas Gavin Jowett, Eagle MT, UT (US); Andrew Mario Beltrano, Colorado Springs, CO (US); Catalin-Emil Fetoiu, Redmond, WA (US); Guillaume Philippe Adrien Hetier, Redmond, WA (US); Matthew Yutaka Ige, Seattle, WA (US); Mitchell James Schmidt, Bellevue, WA (US); Randy Joseph Miller, Newcastle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 198 days.

(21) Appl. No.: 18/068,865

(22) Filed: Dec. 20, 2022

(65) Prior Publication Data
US 2023/0370427 A1 Nov. 16, 2023

Related U.S. Application Data

(60) Provisional application No. 63/342,604, filed on May 16, 2022.

(51) Int. Cl.
*H04L 9/40* (2022.01)
*G06F 9/455* (2018.01)

(52) U.S. Cl.
CPC ...... *H04L 63/0254* (2013.01); *G06F 9/45558* (2013.01); *H04L 63/0209* (2013.01);
(Continued)

(58) Field of Classification Search
CPC ............ H04L 63/0254; H04L 63/0209; H04L 63/0263; H04L 63/0272; G06F 9/45558; G06F 2009/45587; G06F 2009/45595
See application file for complete search history.

(56) References Cited

U.S. PATENT DOCUMENTS

| | | | |
|---|---|---|---|
| 2007/0294755 A1* | 12/2007 | Dadhia | H04L 63/02 726/11 |
| 2008/0002663 A1* | 1/2008 | Tripathi | H04L 45/76 370/351 |

(Continued)

OTHER PUBLICATIONS

"Common Libvirt Errors and Troubleshooting", Retrieved From: https://web.archive.org/web/20220127233216/https://access.redhat.com/documentation/en-us/red_hat_enterprise_linux/7/html/virtualization_deployment_and_administration_guide/sect-troubleshooting-common_libvirt_errors_and_troubleshooting, Jan. 27, 2022, 26 Pages.

(Continued)

*Primary Examiner* — Cheng-Feng Huang
(74) *Attorney, Agent, or Firm* — Newport IP, LLC; Jacob P. Rohwer

(57) ABSTRACT

A network firewall is disclosed that operates between a virtualized environment and the processing system that provides the virtualized environment. The network firewall filters network traffic generated by and destined for program components executing in the virtualized environment. The network firewall can be located in a hypervisor, a flow steering engine, or at another location between the virtualized environment and the processing system. The network firewall utilizes a firewall policy that can be shared with a network firewall on the processing system that filters network traffic originating at or destined for the processing system. The network firewall can filter network traffic based upon a unique identifier assigned to a virtualized environment, upon port numbers assigned to program components in a virtualized environment, or upon profiles assigned to network interfaces. The network firewall can also filter loopback traffic between a guest operating system (OS) and a host OS.

20 Claims, 8 Drawing Sheets

(52) U.S. Cl.
CPC ...... *H04L 63/0263* (2013.01); *H04L 63/0272* (2013.01); *G06F 2009/45587* (2013.01); *G06F 2009/45595* (2013.01)

(56) References Cited

U.S. PATENT DOCUMENTS

| | | | |
|---|---|---|---|
| 2019/0179114 A1* | 6/2019 | Moolenaar | G06F 9/45558 |
| 2020/0089517 A1* | 3/2020 | Paul | G06F 9/48 |
| 2020/0128046 A1* | 4/2020 | Schaefer | H04L 63/20 |
| 2020/0296078 A1* | 9/2020 | Zhou | H04L 63/0218 |
| 2021/0176212 A1* | 6/2021 | Han | H04L 63/0227 |
| 2021/0266346 A1* | 8/2021 | Gordon | H04L 63/0245 |

OTHER PUBLICATIONS

"Host-Only Networking", Retrieved from: https://web.archive.org/web/20210629210556/https://docs.oracle.com/en/virtualization/virtualbox/6.0/user/network_hostonly.html, Jun. 29, 2021, 1 Page.

"VirtualBox host-only network, cannot ping host from guest", Retrieved From: https://superuser.com/questions/1580547/virtualbox-host-only-network-cannot-ping-host-from-guest, Aug. 25, 2020, 4 Pages.

"International Search Report and Written Opinion Issued in PCT Application No. PCT/US23/015836", Mailed Date: Jun. 21, 2023, 14 Pages.

* cited by examiner

PROVIDING A NETWORK FIREWALL BETWEEN A VIRTUALIZED ENVIRONMENT AND A HOST PROCESSING SYSTEM

CROSS-REFERENCE TO RELATED APPLICATIONS

This application claims the benefit of U.S. Provisional Patent Application No. 63/342,604, entitled "Providing a Network Firewall Between a Virtualized Environment and a Host," which was filed on May 16, 2022, and which is expressly incorporated herein by reference in its entirety.

BACKGROUND

Virtualization technologies enable the creation of an abstraction layer over physical hardware that allows a single processing system, commonly referred to as a "host," to provide multiple isolated virtualized environments, commonly referred to as "guests," that can execute an operating system ("OS") and other program components independently from the host. Examples of virtualized environments include virtual machines ("VMs") and containers.

In order to provide an acceptable level of network security when utilizing virtualization technologies, both a host and any virtualized environments provided by the host must be secured. Network firewalls are one mechanism utilized to provide network security. Network firewalls are software components that allow or block network traffic based on a policy.

In some installations, a host will implement a network firewall for securing network traffic originating from or destined for the host itself, but network firewalls will not be implemented within individual virtualized environments provided by the host. In these installations, network traffic originating within or destined for a virtualized environment will not be filtered by the host network firewall, which may reduce the overall security of these environments.

In other installations, both the host and individual virtualized environments provided by the host implement network firewalls. In these installations, however, the host network firewall and the network firewalls implemented in the virtualized environments utilize different policies to allow or block network traffic. This can lead to reduced network security and potentially data exfiltration, particularly where the policy utilized by a network firewall in a virtualized environment is less strict than a host network firewall.

SUMMARY

Technologies are disclosed herein for providing a network firewall between a virtualized environment and a host processing system. Through implementations of the disclosed technologies, network security can be improved in environments where virtualization technologies are utilized. In particular, network traffic originating in or destined for a virtualized environment can be filtered by a network firewall executing on a host that utilizes the same firewall policy as a host network firewall. This can eliminate the need to execute network firewalls in individual virtualized environments, and ensure that firewall policy is applied consistently to network traffic destined for or originating in a virtualized environment and network traffic destined for or originating from a host. Other technical benefits not specifically mentioned herein can also be realized through implementations of the disclosed subject matter.

In an embodiment, a network firewall is configured for operation between a virtualized environment and the processing system that provides the virtualized environment (i.e., the host). The network firewall is configured to filter network traffic received from program components executing in the virtualized environment, such as application programs and components of a guest OS. The network firewall can also filter network traffic that is destined for program components executing in the virtualized environment.

In an embodiment, the network firewall is located in a hypervisor associated with the virtualized environment. In another embodiment, the network firewall is located in a flow steering engine executing on the processing system. The network firewall may operate at other locations between a virtualized environment and the processing system that provides the virtualized environment in other embodiments.

In an embodiment, the network firewall retrieves a firewall policy and filters network traffic originating from or destined for program components executing in the virtualized environment based on the firewall policy. In an embodiment, the processing system executes another network firewall (referred to herein as the "host network firewall") that filters network traffic originating from or destined for a program component executing on the processing system, such as a component of a host OS or an application executing on the host OS. In this embodiment, the network firewall and the host network firewall may share all or a portion of the firewall policy. In this manner, firewall policy can be consistently applied to network traffic originating from or destined for the virtualized environment and network traffic originating from or destined for the processing system.

In an embodiment, a unique identifier ("ID") is assigned to the virtualized environment. In this embodiment, the firewall policy can be configured to cause the network firewall to filter network traffic based on the unique ID assigned to the virtualized environment. In this manner, firewall policy can be applied on a per virtualized environment basis.

In an embodiment, a profile is assigned to a network interface on a host processing system. In this embodiment, the firewall policy can be configured to cause the network firewall to filter network traffic received from or destined for the virtual network adapter based on the profile assigned to the network interface on the host processing system corresponding to the virtual network adapter.

In an embodiment, the disclosed processing system is configured to route loopback traffic between a guest OS executing in a virtualized environment and a host OS executing on the processing system providing the virtualized environment. In this embodiment, the disclosed network firewall can be configured to filter loopback traffic generated by the guest OS and destined for the host OS and loopback traffic generated by the host OS and destined for the guest OS. In an embodiment, aspects of the functionality for enabling loopback traffic between a guest OS and a host OS is provided by assigning the same identity (e.g., network address) to a virtual network adapter in the virtualized environment and a network interface on the processing system.

In an embodiment, the processing system is configured to allocate port numbers to program components executing in the virtualized environment. In this embodiment, the network firewall can utilize the firewall policy to filter network traffic received from or destined for program components executing in the virtualized environment based upon a source or destination port number. In this manner, the network firewall can be configured to apply firewall policy on a per program component basis. For instance, firewall policy can be applied to network traffic generated by applications executing in a virtualized environment on a per-application basis.

The above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
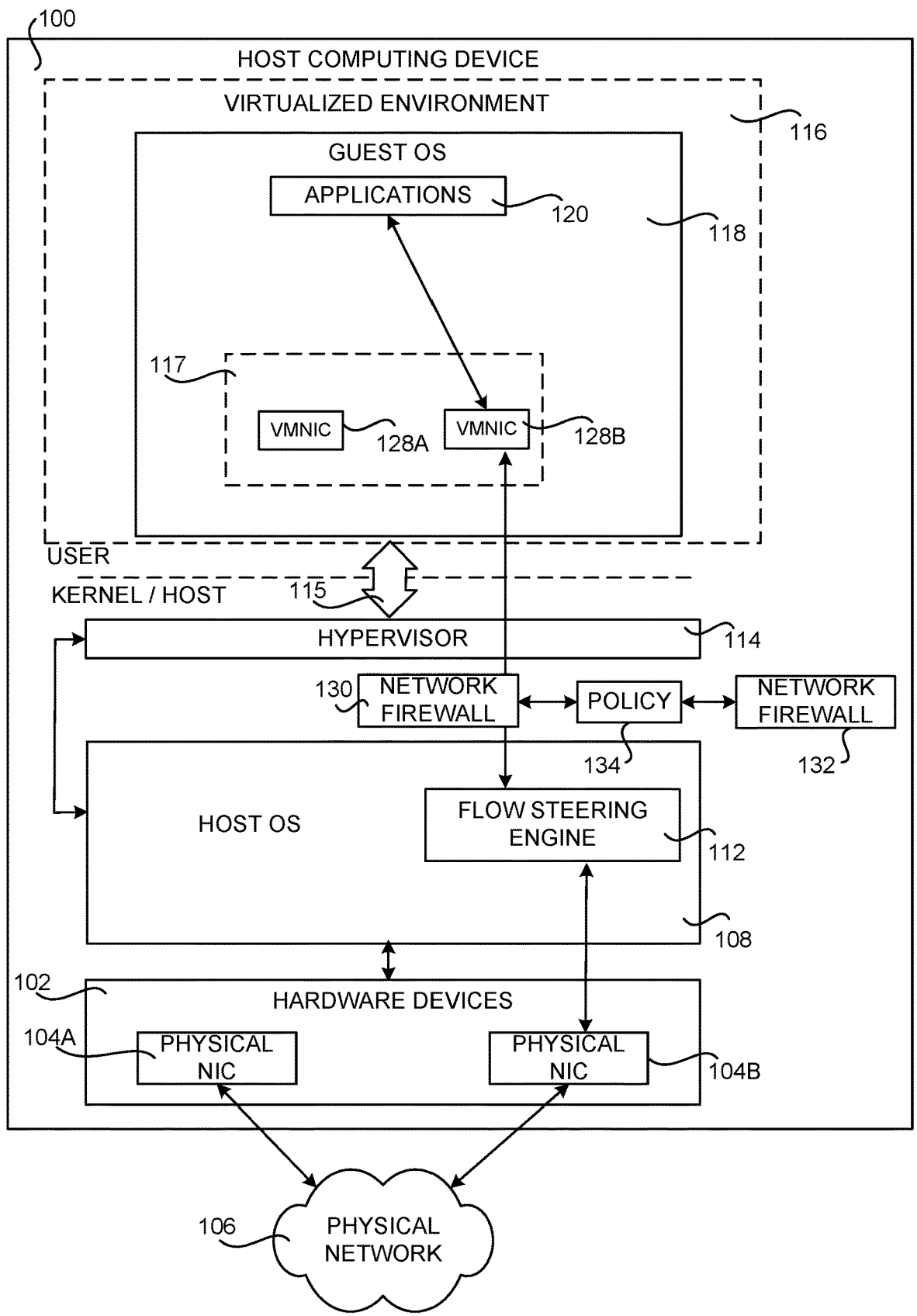
FIG. 1A is a computing system architecture diagram showing aspects of an example mechanism for providing a network firewall between a virtualized environment and a host processing system, according to an embodiment.

The following detailed description is directed to technologies for providing a network firewall between a virtualized environment and a host processing system. As discussed briefly above, various technical benefits can be realized through implementations of the disclosed technologies, such as eliminating the need to execute network firewalls in individual virtualized environments, and ensuring that firewall policy is applied consistently to network traffic destined for or originating in a virtualized environment and network traffic originating at or destined for a host.

As discussed briefly above, virtualization technologies enable the creation of an abstraction layer over physical hardware that allows a single processing system, commonly referred to as a "host," to provide multiple isolated virtualized environments, commonly referred to as "guests," that can execute an OS and other programs independently from the host. Examples of virtualized environments include VMs and containers.

In virtualized environments, guests commonly execute an isolated OS (the "guest OS") that is fully independent of the OS executing on the host (the "host OS"). This creates a deployment where applications and other program components deployed into the guest can run in the OS environment for which they were originally designed, regardless of the host OS. This also allows program components executing in a guest to appear to a user as if they were running on the host directly. Program components are executable programs, such as applications and components of a guest OS.

In one specific example, for instance, a host executing one OS, such as the WINDOWS® OS, might be configured to provide a virtualized environment, such as a container or a VM, that executes a different OS, such as the ANDROID™ OS. In this example, applications and other program components executing in the virtualized environment have access to a runtime environment that is the same as if they were executing directly on a physical device. These program components can, therefore, execute in the virtualized environment without modification. At the same time, a user of the host can see and interact with the program components as if they were running directly on the host.

In order to provide an acceptable level of network security when utilizing virtualization technologies, both a host and any virtualized environments provided by the host must be secured. As mentioned briefly above, network firewalls are one mechanism utilized to provide network security. Network firewalls are software components that allow or block network traffic based on a policy.

In some configurations, a host will implement a network firewall for securing network traffic originating in or destined for the host itself, but individual virtualized environments provided by the host will not implement network firewalls. In these installations, network traffic originating in or destined for a virtualized environment will not be filtered by the host network firewall, which may reduce the overall security of these environments.

In other configurations, both the host and individual virtualized environments provided by the host implement network firewalls. In these configurations, however, the host network firewall and the network firewalls implemented in the virtualized environments utilize different policies to allow or block network traffic. This can lead to reduced network security and potentially data exfiltration, particularly where the policy utilized by a network firewall in a virtualized environment is less strict than a host network firewall.

FIG. 1A is a computing system architecture diagram showing aspects of an example mechanism for providing a network firewall between a virtualized environment and a host processing system, according to an embodiment. In particular, FIG. 1A shows aspects of the configuration and operation of a host processing system 100 (referred to herein as the "host 100") configured to provide a virtualized environment 116, such as a VM or a container.

In order to provide the disclosed functionality, the host 100 includes various hardware devices 102, some of which are not illustrated in FIG. 1A for simplicity, including several physical network interface cards (referred to herein as "network interfaces") 104A and 104B.

Figure 5:
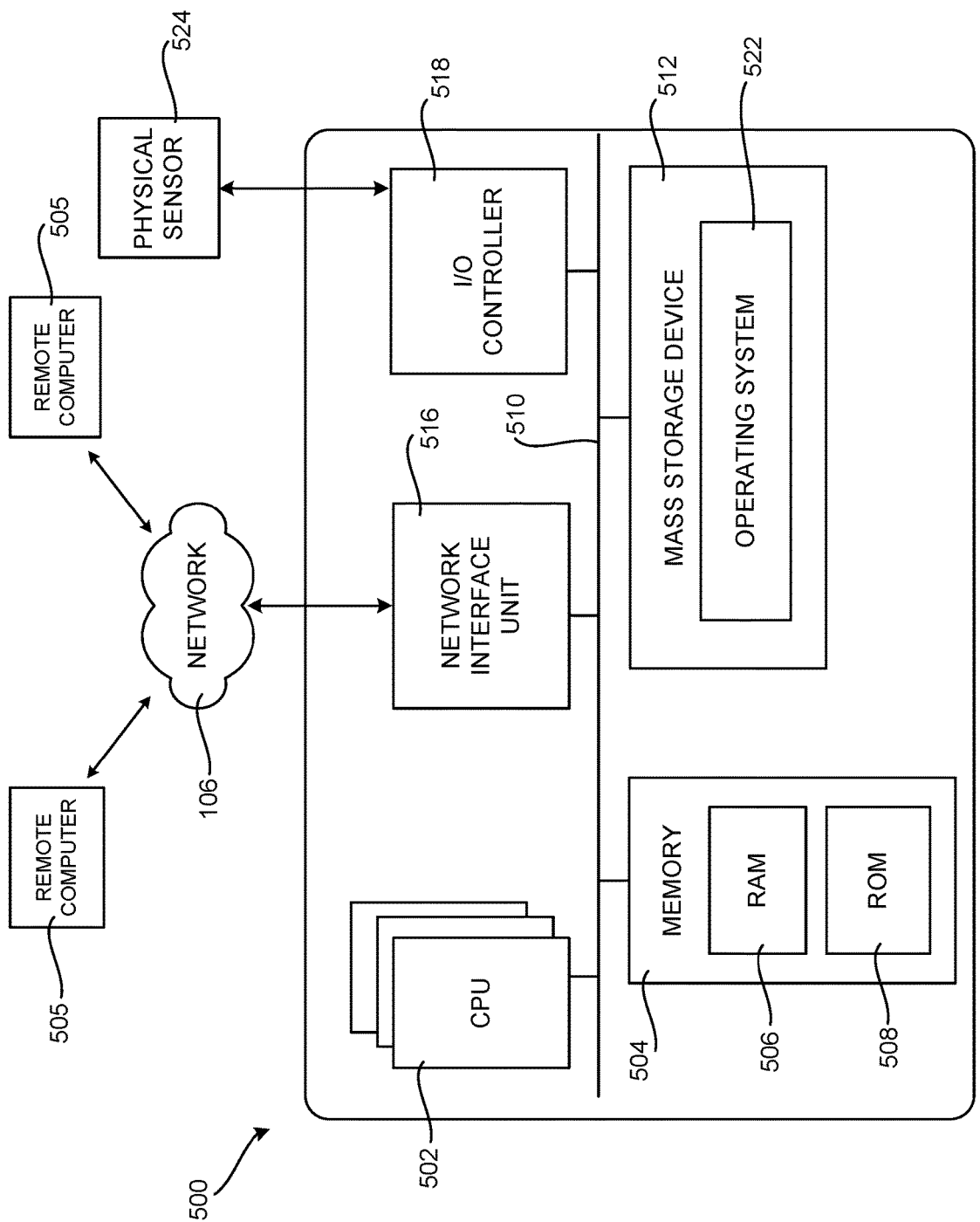
FIG. 5 is a computer architecture diagram showing an illustrative computer hardware and software architecture for a computing device that can implement aspects of the technologies presented herein.

The network interfaces 104A and 104B are hardware devices that provide media access to a physical network 106, such as a wired or wireless local area network, the internet, a cellular network, or a virtual private network ("VPN"). Although two network interfaces 104A and 104B are illustrated in FIG. 1A, the host 100 might include other numbers of network interfaces in other examples. FIG. 5, described below, provides additional detail regarding some of the other hardware components that might be present in the host 100.

A host network stack (not shown in FIG. 1A) handles network communications passing between the host 100 and the physical network 106 via the network interfaces 104A and 104B. The host network stack typically includes appropriate layers of the Open Systems Interconnection ("OSI") model.

As also shown in FIG. 1A and described briefly above, the host 100 executes a host OS 108. In an embodiment, the host OS 108 is a member of the WINDOWS® family of operating systems from MICROSOFT® CORPORATION. Other operating systems from other developers might be utilized as the host OS 108 in other embodiments.

The host 100 also executes a hypervisor 114 in some embodiments. The hypervisor 114 is a software component that virtualizes hardware access for virtualized environments 116, such as VMs and containers. The term "hypervisor," as used herein, is considered to include privileged host-side virtualization functionality commonly found in privileged partitions or hardware isolated virtualized environments.

Virtual machine managers ("VMMs"), container engines, and kernel-based virtualization modules are some examples of hypervisors. The technologies disclosed herein are not, however, limited to these examples and can be utilized with other types of solutions for providing isolated access to virtualized hardware to virtualized environments 116.

In the embodiment illustrated in FIG. 1A, the hypervisor 114 provides support for one or more virtualized environments 116. In an embodiment, the virtualized environment 116 is a container. However, the virtualized environment 116 might be a VM or another type of hardware isolated virtualized environment in other embodiments. A guest-host communication channel 115, such as a socket-based interface, is established between the host 100 and the virtualized environment 116 to enable network communication between the guest OS 118 and the host OS 108 in some embodiments.

As shown in FIG. 1A, and described briefly above, a guest OS 118 can be executed in the virtualized environment 116. In an embodiment, the guest OS 118 is a different OS than the host OS 108. The guest OS 118 includes a complete OS kernel executing fully independently of the kernel of the host OS 108 in some embodiments.

Through virtualization, the guest OS 118 and other program components executing on the guest OS 118, such as the applications 120, can execute in the virtualized environment 116 in the same manner they would if they were executing directly on the host 100 (e.g., executing directly on the host OS 108). The guest OS 118 and other program components executing on the guest OS 118, such as the applications 120, are generally unaware that they are not executing directly on physical hardware.

In an embodiment, the guest OS 118 is the ANDROID™ OS developed by the OPEN HANDSET ALLIANCE™ and commercially sponsored by GOOGLE® LLC. The ANDROID™ OS is a mobile OS based on a modified version of the LINUX® kernel and other open source software and has been designed primarily for touchscreen mobile devices such as smartphones and tablet computing devices.

In another embodiment, the guest OS 118 is the TIZEN™ OS backed by the LINUX FOUNDATION™ and mainly developed and utilized by SAMSUNG® ELECTRONICS CO., LTD. Other operating systems from other developers might be utilized as the guest OS 118 in other embodiments.

In an embodiment, an abstraction layer 117 is provided in the virtualized environment 116 that ensures that the guest OS 118 and other program components executing thereupon, such as the applications 120, do not encounter an unsupported network configuration. In an embodiment, network interfaces 104A and 104B available to the host 100 are projected into the virtualized environment 116 by creating corresponding virtual network adapters 128A and 128B in the virtualized environment 116.

The virtual network adapters 128A and 128B are virtual Ethernet adapters in the embodiment shown in FIG. 1A, but might be implemented as other types of network adapters in other embodiments. The virtual network adapters 128A and 128B in the virtualized environment 116 need not be of the same type as the network interfaces 104A and 104B to which they correspond. For instance, in the illustrated example, the network interface 104B might be a Wi-Fi® adapter while the virtual network adapter 128B in the virtualized environment 116 might be an Ethernet adapter.

Network packets received from an application 120 by the virtual network adapter 128A or 128B are forwarded to a flow steering engine ("FSE") 112, described below, and routed to a network interface 104 on the host, such as the network interface 104B in the illustrated embodiment, for transmission on the physical network 106. Similarly, network packets received at an network interface 104 and destined for the virtualized environment 116 can be routed to the FSE 112, the virtual network adapter 128B and, finally, to the destination program component in the virtualized environment 116.

As discussed briefly above, once the network interfaces 104A and 104B have been mirrored into the virtualized environment 116 and the abstraction layer 117 has been created in the virtualized environment 116 in the manner described above, the host 100 can be configured to properly route network traffic between a network interface 104 on the host 100 and the virtualized environment 116. In order to provide this functionality, each independent OS (e.g., the host OS 108 and the guest OS 118) assigns the same unique identity (e.g., the same network address and the same media access control ("MAC") address) to their corresponding network adapters in an embodiment. For instance, in the embodiment shown in FIG. 1A, the same unique identity is assigned to the virtual network adapter 128B and the network interface 104B that it is mirroring.

Additionally, and as mentioned briefly above, the FSE 112 is executed on the host 100. The FSE 112 is a software component configured to route network packets to and from the virtualized environment 116 through a virtual switch (not shown in FIG. 1A) connected to the virtualized environment 116. The FSE 112 is an OS driver in an embodiment, but might be implemented as another type of component in other embodiments. For instance, the FSE 112 may be implemented as part of a Transmission Control Protocol ("TCP")

or User Datagram Protocol ("UDP") module, as a shim or filter between the transport layer and another layer of the host network stack, or in another manner.

In an embodiment, the FSE 112 routes network traffic to and from the virtualized environment 116 by determining which packets are destined for the host 100 and which are destined for the virtualized environment 116 by tracking unique OSI Layer 4 identifiers, such as TCP and UDP port numbers. In this manner, the guest OS 118 can be utilized without modifying its network stack, and the host OS 108 can largely have an unmodified network stack (e.g., only the FSE 112 is added to the network stack of the host OS 118). Following the operations described above, the guest OS 118 will have a single virtual network adapter 128 that is active and configured to mirror a network interface 104 on the host 100.

In the embodiment shown in FIG. 1A, a network firewall 130 is interposed between the virtualized environment 116 and the host 100. The network firewall 130 might be placed at other locations in other embodiments. For instance, in the embodiment shown in FIG. 1B, the network firewall 130 is located in the FSE 112, such as within or in conjunction with a virtual switch implemented by the FSE 112. As another example, the network firewall 130 is located in the hypervisor 114 in the embodiment illustrated in FIG. 1C.

In an embodiment where the FSE 112 is not utilized, a network address translation ("NAT") layer is interposed between the virtualized environment 116 and the host 100. The network firewall 130 can be implemented as part of the NAT layer in this embodiment. The network firewall may operate at other locations between a virtualized environment 116 and the processing system (e.g., the host 100) that provides the virtualized environment 116 in other embodiments.

As will be described in greater detail below, the network firewall 130 filters network traffic originating from the virtualized environment 116 or destined for the virtualized environment 116 based on a policy 134. The network firewall 130 can provide the disclosed functionality even when the host OS 108 and guest OS 118 share the same IP address and network address space in the manner described above. Additionally, the network firewall 130 can apply the policy 134 to loopback traffic 202 originating from the virtualized environment 116 or the host 100. Additional details regarding these aspects will be provided below.

As discussed briefly above, the network firewall 130 can consume a policy 134 that defines how the network firewall 130 should filter network traffic that originated within the virtualized environment 116 or that is destined for the virtualized environment 116. For example, in some embodiments, a user can specify destination network addresses for network traffic originating in the virtualized environment 116 that is to be blocked. A user might also, or alternately, specify that network traffic is to be filtered based on destination port number, specific classes of internet protocol ("IP") addresses, packet type, the identity of the currently logged-in user, or other parameters. In some embodiments, an appropriate user interface ("UI") (not shown in FIGS. 1A-1C) is provided for specifying the firewall policy 134.

In general, any firewall policy 134 that can be applied to a 5-tuple can be applied by the network firewall 130 to network traffic originating from the virtualized environment 116 or destined for the virtualized environment 116. The term 5-tuple refers to the set of five different values that comprise a transmission control protocol/internet protocol ("TCP/IP") connection. A 5-tuple includes a source IP address/port number, destination IP address/port number, and the protocol in use. The network firewall 130 can filter based on 5-tuple values or other network parameters (e.g., socket endpoints or process ID) in other embodiments.

In an embodiment, the processing system executes another network firewall 132 (referred to herein as the "host network firewall") that filters network traffic originating from or destined for a program component executing on the host 100, such as a component of the host OS 108 or an application executing on the host OS 108. In this embodiment, the network firewall 130 and the host network firewall 132 may share all or a portion of the firewall policy 134. In this manner, the same firewall policy 134 can be consistently applied to network traffic originating from or destined for the virtualized environment 116 and network traffic originating from or destined for the host 100.

In an embodiment, a unique ID is generated and assigned to each virtualized environment 116 executing on the host 100. In these embodiments, the IDs assigned to the virtualized environments 116 can be utilized to implement firewall policy 134 that is differentiated based upon the entity that created the virtualized environment 116 or the type of virtualized environment 116 that is created. For instance, a firewall policy 134 might be applied to a virtualized environment 116 executing one guest OS 118 (e.g., the ANDROID™ OS), while a different policy 134 or aspect of the policy 134 might be applied to a virtualized environment 116 executing another guest OS 118 (e.g., the WINDOWS® OS).

In an embodiment, the network interfaces 104 are assigned a profile, which is configurable by policy or by a user. For instance, a network interface 104A might be assigned a "public" profile while another network interface 104B might be assigned a "private" profile or a "domain" profile.

The assigned profiles indicate a level of trust associated with a particular network connected to a network interface 104. For instance, a public profile may be assigned to a network interface 104 when that network interface 104 is connected to a public network, like a publicly available Wi-Fi® network. A private profile might be assigned to a network interface 104 when that network interface 104 is connected to a partially trusted network, such as a user's home network. A domain profile might be assigned to a network interface 104 connected to a fully trusted network, such as a corporate network. Other types of profiles can be assigned to the a network interface 104 in other embodiments.

In embodiments where profiles are assigned to the network interfaces 104 as described above, the firewall policy 134 can be applied selectively to network traffic originating from or destined for each adapter 128 based on the profile that has been assigned to the corresponding network interface 104. For example, the firewall policy 134 might specify that certain types of network traffic are to be filtered when a public profile has been assigned to a network interface 104, but allow the same types of network traffic when a domain profile has been assigned to a network interface 104. This functionality can be provided even though the guest OS 118 is unaware of the distinction between virtual adapter types.

Figure 2:
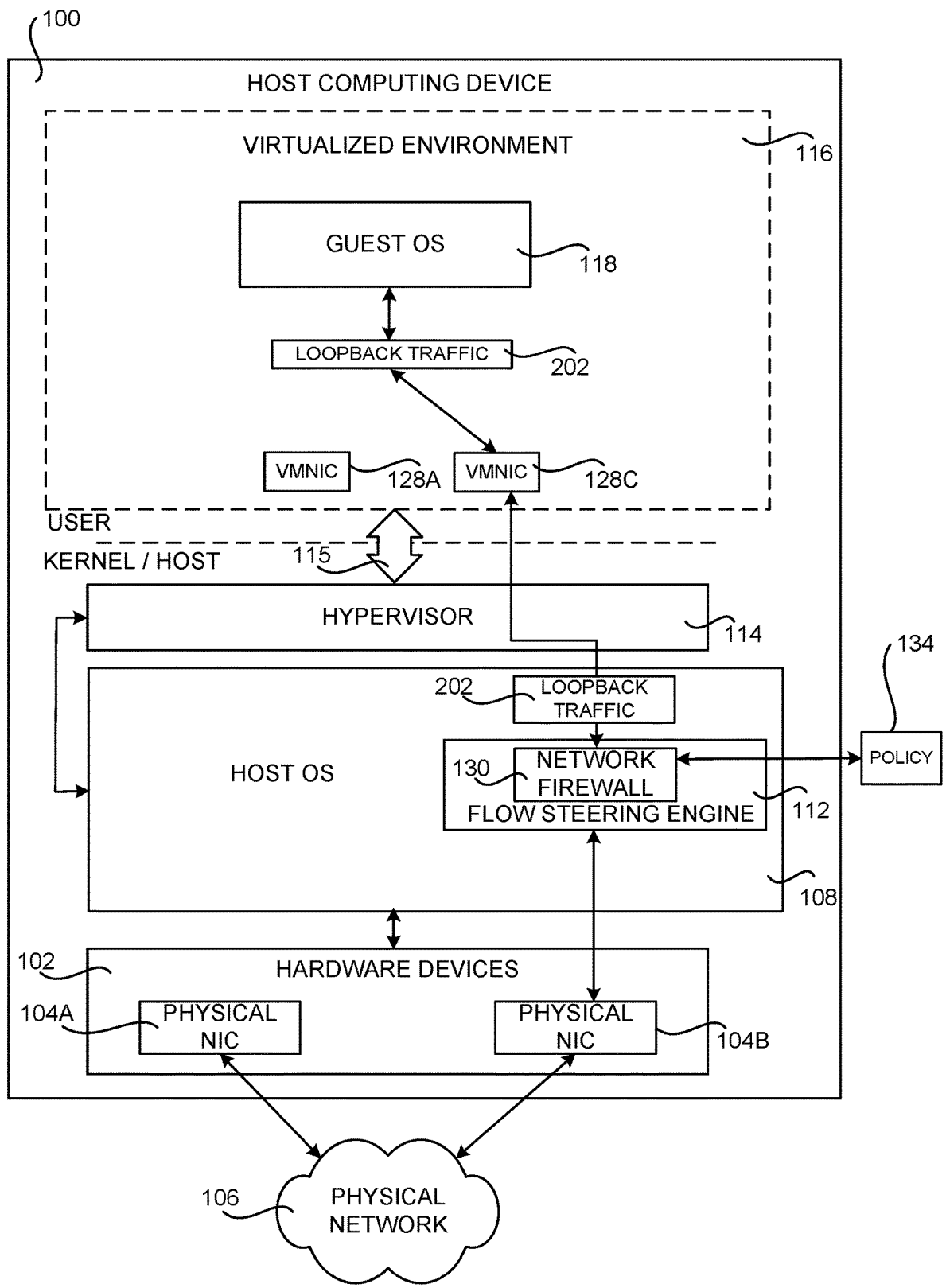
FIG. 2 is a computing system architecture diagram showing aspects of an example mechanism disclosed herein for filtering loopback traffic generated by a guest or host operating system, according to an embodiment.

As described briefly above, in an embodiment the network firewall 130 can also filter loopback traffic between a guest OS 118 and a host OS 108. Details regarding this embodiment are illustrated in FIG. 2 and described in detail below.

The IP protocol reserves the entire address block 127.0.0.0/8 for use as a loopback mechanism, with the address 127.0.0.1 commonly supported as the standard address for IPV4 loopback traffic. The IPV6 standard assigns only a single address for loopback. Any packet sent to an address reserved for loopback traffic will bypass local network interface hardware and will be looped back to the host.

In conventional usage, the loopback mechanism described above is utilized by a single OS, such as the host OS 108, to communicate with itself. In the environment shown in FIG. 2, and described herein, however, there are two (or more) operating systems: the host OS 108 and one or more guest operating systems 118 executing in virtualized environments 116. The mechanism described below with reference to FIG. 2 enables the host OS 108 and a guest OS 118 to communicate using the same loopback mechanism. Additionally, and as described in greater detail below, the network firewall 130 can apply the firewall policy 134 to filter the loopback traffic.

In order to enable communication between a host OS 108 and a guest OS 118 executing in a virtualized environment 116 via a loopback interface, a virtual adapter 128C is created in the virtualized environment 116 in the manner described above with regard to FIG. 1A. The virtual adapter 128C is reserved for loopback traffic 202 between the virtualized environment 116 and the host 100.

The guest OS 118 is also configured to route loopback traffic 202 out the virtual adapter 128C. For example, in one embodiment a custom routing table is created in the guest OS 118 that includes routing rules for routing loopback traffic 202 to the virtual adapter 128C. A single default gateway (not shown in FIG. 2) is created to enable packets to flow from the guest OS 118 to the host 100. The gateway is configured with a static Address Routing Protocol ("ARP") entry for routing traffic out of the virtualized environment 116, with a reserved MAC address. In this way, all loopback packets will have the same destination MAC address.

In operation, loopback traffic 202 originating in the virtualized environment 116 is routed out the virtual adapter 128C to the FSE 112 via the default gateway described above. The FSE 112 receives the loopback traffic 202 and identifies the destination interface for the received loopback traffic 202.

For example, the FSE 112 may determine whether loopback traffic 202 is destined for the virtualized environment 116 or the host 100 based upon the destination port number specified by the loopback traffic 202. As will be discussed below with regard to FIG. 3, the FSE 112 maintains a data store in an embodiment that identifies port assignments for both applications executing on the host OS 108 and applications 120 executing in one or more virtualized environments 116. Using this data, the FSE 112 can determine whether the destination for loopback traffic 202 is in the virtualized environment 116 or the host 100.

If the destination for the loopback traffic 202 is in the virtualized environment 116, the FSE 112 routes the loopback traffic 202 back into the virtualized environment 116. If the destination for loopback traffic 202 is on the host 100, the FSE 112 routes the loopback traffic 202 to the loopback interface of the host 100. In a similar fashion to that described above, the FSE 112 can also steer loopback traffic 202 originating from the host OS 108 to the proper destination in the virtualized environment 116 or on the host 100.

The embodiment illustrated in FIG. 2 is applicable to TCP/IP or UDP loopback traffic 202. For other protocols, the FSE 112 might transmit loopback traffic 202 to both the host 100 and the virtualized environment 116. Loopback traffic 202 that utilizes protocols other than TCP/IP or UDP can be routed in other ways in other embodiments.

Figure 1B:
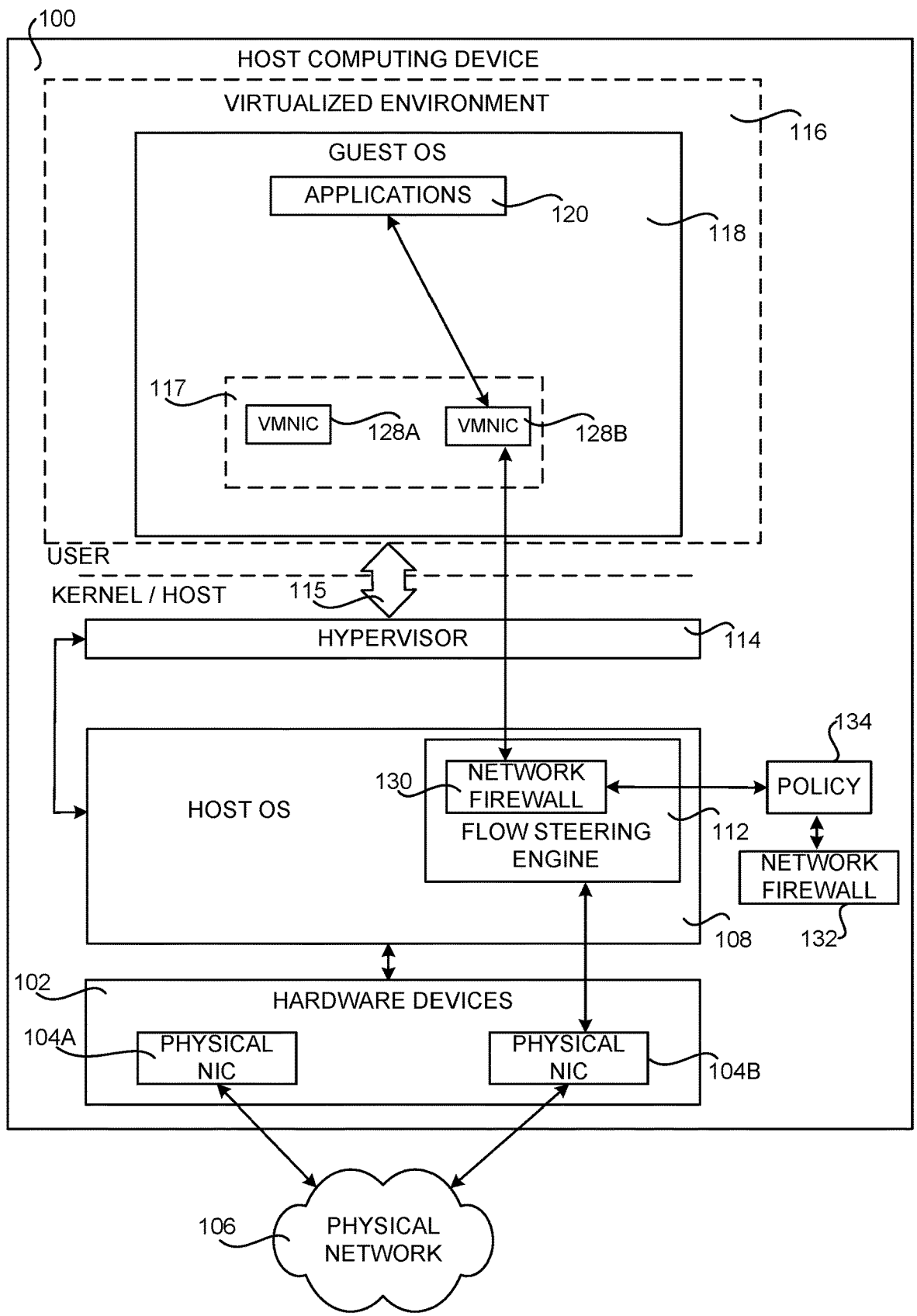
FIG. 1B is a computing system architecture diagram showing aspects of another example mechanism for providing a network firewall between a virtualized environment and a host processing system, according to an embodiment.
Figure 1C:
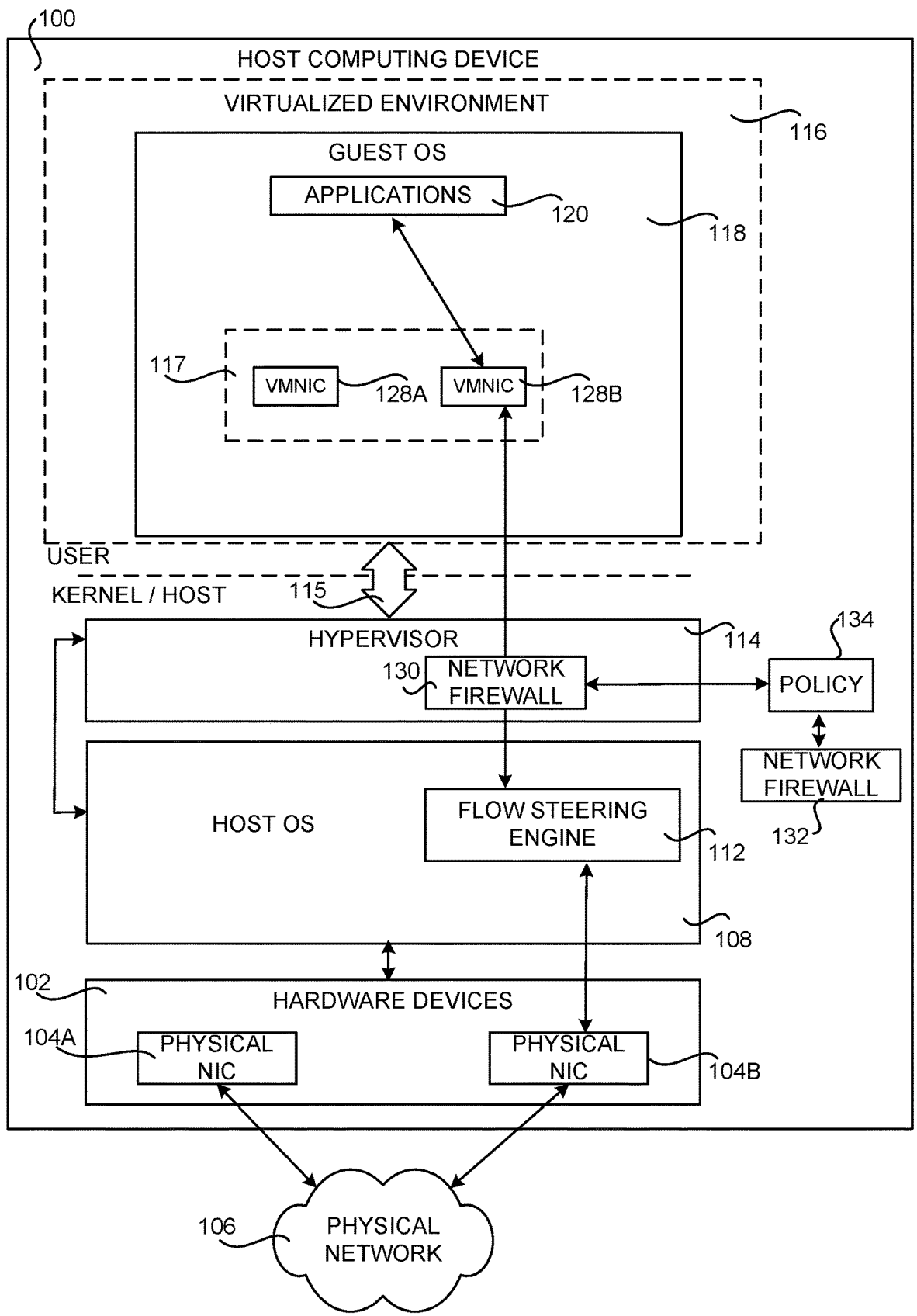
FIG. 1C is a computing system architecture diagram showing aspects of another example mechanism for providing a network firewall between a virtualized environment and a host processing system, according to an embodiment.

As discussed briefly above, the network firewall 130 can filter loopback traffic 202 in an embodiment. In this embodiment, the network firewall 130 can be implemented in the FSE 112 (as shown in FIG. 1B), which is an OS kernel driver in this embodiment, or the hypervisor 114 (as shown in FIG. 1C). As also discussed above, the FSE 112 receives network traffic from the virtual adapter 128C and manages port allocation in the manner described below. Consequently, the FSE 112 can determine the source and destination for network traffic originating in the virtualized environment 116 or the host 100.

Using the source and destination information, the FSE 112 can allow loopback traffic 202 that is to be returned to the virtualized environment 116 in the manner described above. The FSE 112 can also block loopback traffic 202 that is destined for the host OS 108 based on the firewall policy 134 (e.g., if the firewall policy 134 indicates that either the virtualized environment 116 or the host 100 have blocked loopback traffic 202).

As described briefly above, in an embodiment the host 100 is configured to allocate port numbers to program components executing in the virtualized environment 116, such as the applications 120 or components of the guest OS 118. In this embodiment, the network firewall 130 can utilize the firewall policy 134 to filter network traffic received from or destined for program components executing in the virtualized environment 116 based upon a source or destination port number. In this manner, the network firewall 130 can be configured to apply firewall policy 134 on a per program component basis. For instance, the network firewall 130 can apply firewall policy 134 to network traffic generated by applications 120 executing in a virtualized environment on a per-application basis. Additional details regarding this aspect will be described below with regard to FIG. 3.

Figure 3:
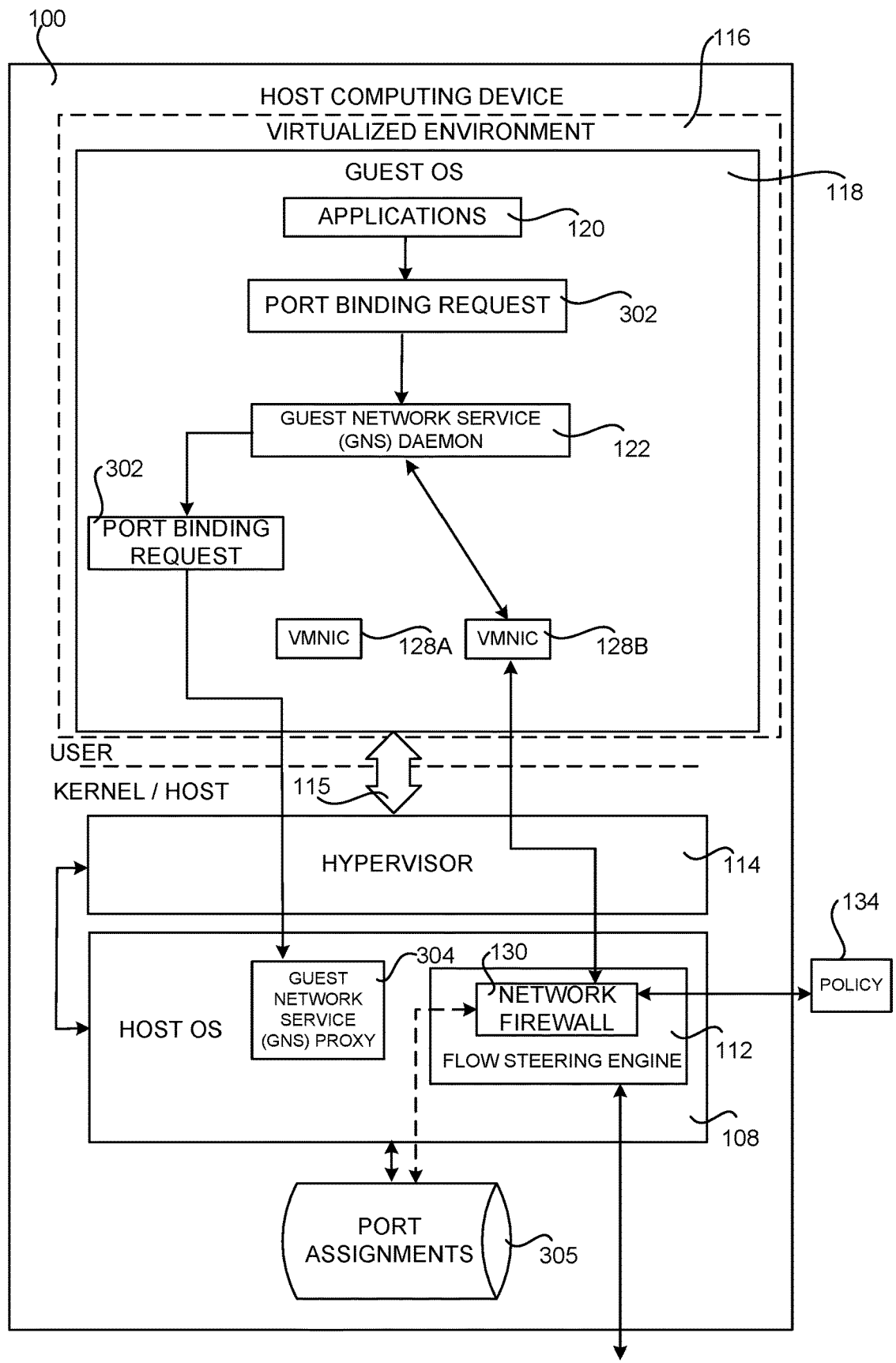
FIG. 3 is a computing system architecture diagram showing aspects of an example mechanism disclosed herein for filtering network traffic based upon port numbers assigned to program components executing in a virtualized environment, according to an embodiment.

Turning now to FIG. 3, additional details will be provided regarding the mechanism described briefly above for filtering network traffic based upon port numbers assigned to program components executing in a virtualized environment 116, according to an embodiment. As known to those skilled in the art, a port number must be specified in order to make a unique network connection using the TCP and UDP protocols. The port numbers are utilized to uniquely identify the packets associated with each network connection.

In a non-virtualized environment, an OS typically receives requests for port numbers, which might be referred to herein as "port binding requests," and responds to those requests with unused port numbers. The OS keeps track of which port numbers have been assigned, and ensures that the same port number is not assigned to more than one process. The OS also reclaims port numbers when they are no longer in use. For instance, an application might indicate to the OS that previously assigned port numbers are no longer in use. The OS can then add those port numbers back to a pool of available port numbers.

In environments utilizing virtualization technologies such as those described above, however, there are multiple operating systems (e.g., the guest OS 118 and the host OS 108), which are generally unaware of one another. In these environments, the requirement that applications be assigned unique port numbers extends to both applications executing on the host OS 108 and to applications 120 executing on the guest OS 118. The mechanism illustrated in FIG. 3 enables this functionality, according to one embodiment disclosed herein.

In the embodiment shown in FIG. 3, a daemon, such as the guest network service ("GNS") daemon 122, or another component such as a network filter, intercepts port binding requests 302 made by program components executing in the virtualized environment 116. As discussed above, port binding requests 302 are requests for a unique port number, or numbers, utilized by the TCP and UDP protocols.

The GNS daemon 122 is a software component (e.g., a daemon) that intercepts network control messages from program components executing in the virtualized environment 116 and forwards the messages to a GNS proxy 304 executing on the host 100. The GNS proxy 304 is a software component that is configured to receive forwarded network control messages from the GNS daemon 122 and to implement aspects of operations requested by the network control messages.

For instance, the GNS daemon 122 might intercept a port binding request 302 from a program component executing in the virtualized environment 116, such as an application 120. In response to intercepting a port binding request 302, the GNS daemon 122 forwards the port binding request 302 to the GNS proxy 304. In turn, the GNS proxy 304, or another component, requests the desired port number, or numbers, from the host OS 108.

The host OS 108 determines if the requested port number, or numbers, is available by consulting a data store 305 that identifies port assignments for both applications executing on the host OS 108 and applications 120 executing in one or more virtualized environments 116. If the requested port number, or numbers, is available, the host OS 108 updates the data store 305 to indicate that the port number, or numbers, is in use by the requesting program component. For instance, the host OS 108 might store an application ID for the requesting program component provided by the GNS daemon 122 for the with the port number assigned to the requesting program component.

The host OS 108 also notifies the requestor (e.g., the GNS proxy 304 in an embodiment) that the port binding request 302 has succeeded. If the requested port number, or numbers, is not available, the host OS notifies the requestor (e.g., the GNS proxy 304 in an embodiment) that the port binding request 302 has failed.

The GNS proxy 304, in turn, provides a response to the GNS daemon 122 indicating that the port binding request 302 failed or was successful. The GNS daemon 122 then provides a response to the requesting program component indicating that the port binding request 302 failed or was successful. If the port binding request 302 was successful, the GNS daemon 122 provides the assigned port number to the requesting program component.

The GNS daemon 122, or another component such as a network filter, can also be configured to intercept port unbinding requests that indicate that a particular port, or ports, is no longer in use by a program component. The processing of a port unbinding request is similar to that described above for a port binding request 302, except that the host OS 108 will add the port number, or numbers, that is no longer in use back to the pool of available ports identified in the data store 305. In a similar fashion, if the host OS 108 determines that the virtualized environment 116 is no longer present, the host OS 108 may add the port assignments previously made to program components executing in the virtualized environment 116 back to the pool of available port numbers in the data store 305.

As described briefly above, the network firewall 130 can utilize the firewall policy 134 and the port assignments recorded in the data store 305 to filter network traffic received from or destined for program components executing in the virtualized environment 116 based upon a source or destination port number. In this manner, the network firewall 130 can be configured to apply firewall policy 134 on a per program component basis. For instance, firewall policy 134 may be defined indicating rules for filtering network traffic originating from or destined for a particular program component executing in the virtualized environment 116, such as a particular application 120.

In this example, the network firewall 130 can determine the source or destination port number for network traffic destined for or originating from the virtualized environment 116. The network firewall 130 can then consult the port assignments in the data store 305 to identify the source or destination program component in the virtualized environment 116 based upon the port number. Once the source or destination program component has been identified, the network firewall 130 can apply the network policy 134 to the network traffic based upon the identity of the source or destination program component.

Figure 4:
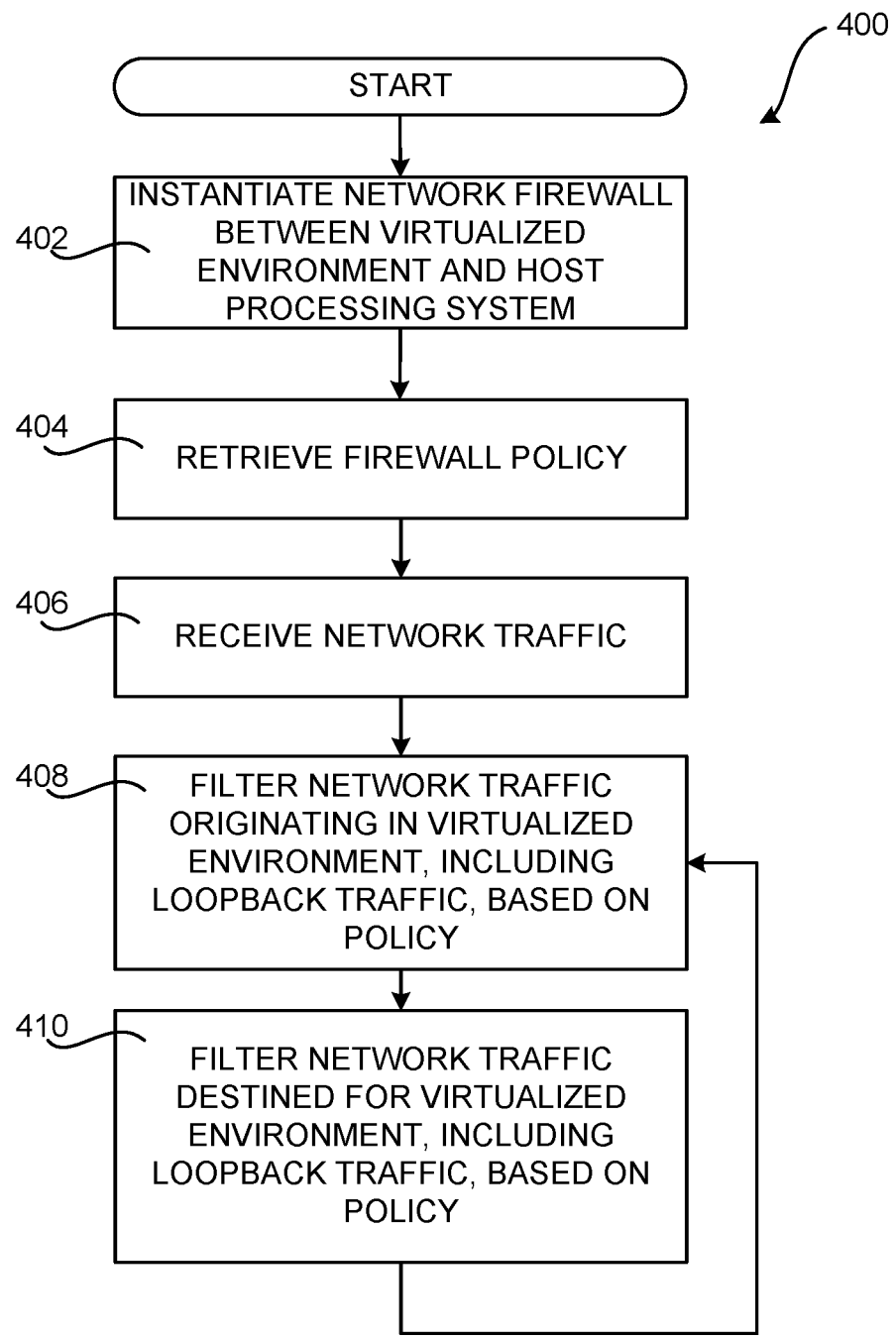
FIG. 4 is a flow diagram showing a routine that illustrates aspects of the example mechanisms shown in FIGS. 1A-3 for providing a network firewall between a virtualized environment and a host processing system, according to an embodiment.

FIG. 4 is a flow diagram showing a routine 400 that illustrates aspect of the mechanism shown in FIGS. 1A-4 for providing a network firewall 130 between a virtualized environment 116 and a host 100, according to one embodiment disclosed herein. The routine 400 begins at operation 402, where the network firewall 130 is instantiated between the virtualized environment 116 and the host 100. As discussed above, the network firewall 130 may be implemented within or outside the FSE 112, in a hypervisor 114, in conjunction with a virtual switch interposed between the virtualized environment 116 and the host 100, or in conjunction with a NAT. The network firewall 130 might be instantiated at other locations between the virtualized environment 116 and the host 100 in other embodiments.

From operation 402, the routine 400 proceeds to operation 404 where the network firewall 130 retrieves the firewall policy 134. As discussed above, the firewall policy 134 is specified by a user in some embodiments. In other embodiments, the firewall policy 134 is generated based on a firewall policy utilized by a host network firewall 132 configured to filter network traffic originating within or destined for the host OS 108. The firewall policy 134 can be defined in other ways in other embodiments.

From operation 404, the routine 400 proceeds to operation 406, where the network firewall 130 receives network traffic. For example, the network firewall 130 can receive network traffic generated within the virtualized environment 116 and destined for the host 100 (e.g., loopback traffic 202) or destined for another network endpoint. Similarly, the network firewall 130 can receive network traffic generated by the host 100 (e.g., loopback traffic 202) or generated at another network endpoint and destined for the virtualized environment 116.

From operation 406, the routine 400 proceeds to operation 408, where the network firewall 130 filters network traffic originating in the virtualized environment 116, including loopback traffic 202, based on the firewall policy 134. The routine 400 then proceeds to operation 410 where the network firewall 130 filters network traffic destined for the virtualized environment 116, including loopback traffic 202, based on the firewall policy 134. The routine 400 then proceeds from operation 410 to operation 408, where the network firewall 130 can continue filtering of network traffic in the manner described above.

FIG. 5 is a computer architecture diagram showing an illustrative computer hardware and software architecture for a processing system 500 that can implement the various technologies presented herein. In particular, the architecture illustrated in FIG. 5 can be utilized to implement a host 100 capable of providing aspects of the functionality disclosed herein.

The processing system 500 illustrated in FIG. 5 includes a central processing unit 502 ("CPU"), a system memory 504, including a random-access memory 506 ("RAM") and a read-only memory ("ROM") 508, and a system bus 510 that couples the system memory 504 to the CPU 502. Firmware (not shown in FIG. 5) containing the basic routines that help to transfer information between elements within the processing system 500, such as during startup, can be stored in the ROM 508.

The processing system 500 further includes a mass storage device 512 for storing an operating system 522, such as the host OS 108, application programs, and other types of programs, some of which have been described herein. The mass storage device 512 can also be configured to store other types of programs and data.

The mass storage device 512 is connected to the CPU 502 through a mass storage controller (not shown in FIG. 5) connected to the bus 510. The mass storage device 512 and its associated computer readable media provide non-volatile storage for the processing system 500. Although the description of computer readable media contained herein refers to a mass storage device, such as a hard disk, Compact Disk Read-Only Memory ("CD-ROM") drive, Digital Versatile Disc-Read Only Memory ("DVD-ROM") drive, or Universal Serial Bus ("USB") storage key, computer readable media can be any available computer-readable storage media or communication media that can be accessed by the processing system 500.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, communication media includes wired media such as a wired network or direct-wired connection, and wireless media such as acoustic, radio frequency, infrared and other wireless media. Combinations of the any of the above are also included within the scope of computer-readable media.

By way of example, computer-readable storage media can include volatile and non-volatile, removable and non-removable media implemented in any method or technology for storage of information such as computer readable instructions, data structures, program modules or other data. For example, computer-readable storage media includes RAM, ROM, erasable programmable ROM ("EPROM"), electrically EPROM ("EEPROM"), flash memory or other solid-state memory technology, CD-ROM, DVD-ROM, HD-DVD, BLU-RAY®, or other optical storage, magnetic cassettes, magnetic tape, magnetic disk storage or other magnetic storage devices, or any other medium that can be used to store the desired information and which can be accessed by the processing system 500. For purposes of the claims, the phrase "computer-readable storage medium," and variations thereof, does not include waves or signals per se or communication media.

According to various configurations, the processing system 500 can operate in a networked environment using logical connections to remote computers 505 through a network such as the network 106. The processing system 500 can connect to the network 106 through a network interface unit 516 connected to the bus 510. The network interface unit 516 can also be utilized to connect to other types of networks and remote computer systems.

The processing system 500 can also include an input/output controller 518 for receiving and processing input from a number of other devices, including a keyboard, mouse, touch input, an electronic stylus (none of which are shown in FIG. 5), or a physical sensor 524, such as a video camera. Similarly, the input/output controller 518 can provide output to a display screen or other type of output device (also not shown in FIG. 5).

The software components described herein, when loaded into the CPU 502 and executed, can transform the CPU 502 and the overall processing system 500 from a general-purpose computing device into a special-purpose processing system customized to facilitate the functionality presented herein. The CPU 502 can be constructed from any number of transistors or other discrete circuit elements, which can individually or collectively assume any number of states. More specifically, the CPU 502 can operate as a finite-state machine, in response to executable instructions contained within the software modules disclosed herein. These computer-executable instructions can transform the CPU 502 by specifying how the CPU 502 transitions between states, thereby transforming the transistors or other discrete hardware elements constituting the CPU 502.

Encoding the software modules presented herein can also transform the physical structure of the computer readable media presented herein. The specific transformation of physical structure depends on various factors, in different implementations of this description. Examples of such factors include, the technology used to implement the computer readable media, whether the computer readable media is characterized as primary or secondary storage, and the like.

For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the program components presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

Many types of physical transformations take place in the processing system 500 in order to store and execute the software components presented herein. The architecture shown in FIG. 5 for the processing system 500, or a similar architecture, can be utilized to implement other types of computing devices, including hand-held computers, video game devices, embedded computer systems, mobile devices such as smartphones, tablets, alternate reality ("AR"), mixed reality ("MR"), and virtual reality ("VR") devices, and other types of computing devices known to those skilled in the art. It is also contemplated that the processing system 500 might not include all of the components shown in FIG. 5, can include other components that are not explicitly shown in FIG. 5, or can utilize an architecture completely different than that shown in FIG. 5.

Figure 6:
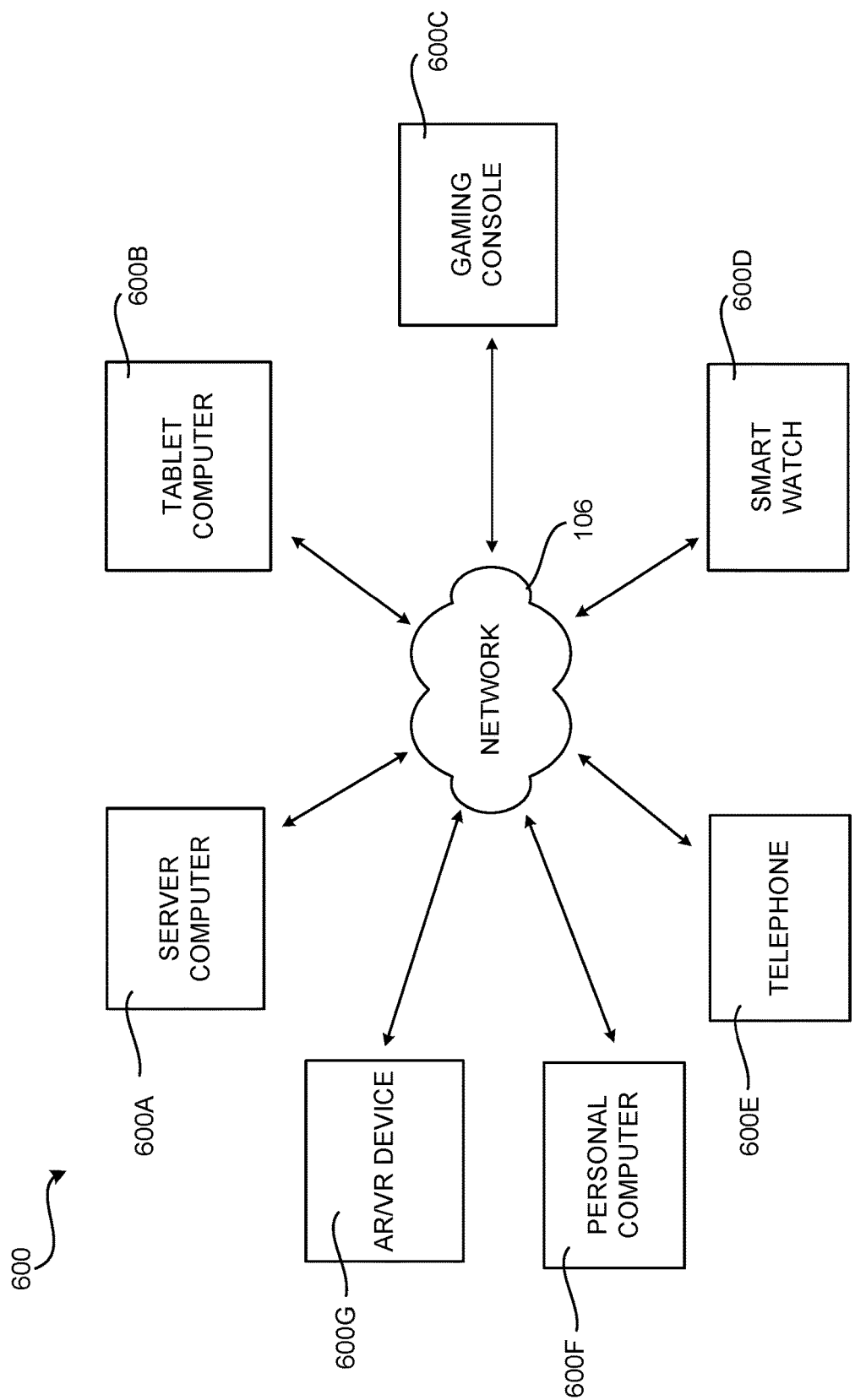
FIG. 6 is a network diagram illustrating an example distributed computing environment in which aspects of the disclosed technologies can be implemented.

FIG. 6 is a network diagram illustrating a distributed network computing environment 600 in which aspects of the disclosed technologies can be implemented, according to various embodiments presented herein. As shown in FIG. 6, one or more server computers 600A can be interconnected via a network 106 (which may be either of, or a combination of, a fixed-wire or WLAN, wide-area network ("WAN"), intranet, extranet, peer-to-peer network, VPN, the internet, Bluetooth® communications network, proprietary low voltage communications network, or other communications network) with a number of client computing devices such as a tablet computer 600B, a gaming console 600C, a smart watch 600D, a telephone 600E, such as a smartphone, a personal computer 600F, and an AR/VR device 600G.

In a network environment in which the network 106 is the internet, for example, the server computer 600A can be a dedicated server computer operable to process and communicate data to and from the client computing devices 600B-600G via any of a number of known protocols, such as, hypertext transfer protocol ("HTTP"), file transfer protocol ("FTP"), or simple object access protocol ("SOAP").

Additionally, the network computing environment 600 can utilize various data security protocols such as secured socket layer ("SSL") or pretty good privacy ("PGP"). Each of the client computing devices 600B-600G can be equipped with an OS, such as the host OS 108, operable to support one or more computing applications or terminal sessions such as a web browser (not shown in FIG. 6), graphical UI (not shown in FIG. 6), or a mobile desktop environment (not shown in FIG. 6) to gain access to the server computer 600A.

The server computer 600A can be communicatively coupled to other computing environments (not shown in FIG. 6) and receive data regarding a participating user's interactions. In an illustrative operation, a user (not shown in FIG. 6) may interact with a computing application running on a client computing device 600B-600G to obtain desired data and/or perform other computing applications.

The data and/or computing applications may be stored on the server 600A, or servers 600A, and communicated to cooperating users through the client computing devices 600B-600G over the network 106. A participating user (not shown in FIG. 6) may request access to specific data and applications housed in whole or in part on the server computer 600A. These data may be communicated between the client computing devices 600B-600G and the server computer 600A for processing and storage.

The server computer 600A can host computing applications, processes and applets for the generation, authentication, encryption, and communication of data and applications such as those described above with regard to FIGS. 1A-4, and may cooperate with other server computing environments (not shown in FIG. 6), third party service providers (not shown in FIG. 6), and network attached storage ("NAS") and storage area networks ("SAN") (not shown in FIG. 6) to realize application/data transactions.

The computing architecture shown in FIG. 5 and the distributed network computing environment shown in FIG. 6 have been simplified for ease of discussion. The computing architecture and the distributed computing network can include and utilize many more computing components, devices, software programs, networking devices, and other components not specifically described herein.

While the subject matter described above has been presented in the general context of computing devices implementing virtualized environments, such as VMs and containers, those skilled in the art will recognize that other implementations can be performed in combination with other types of computing devices, systems, and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation, etc.), minicomputers, mainframe computers, and the like.

It is to be further understood that the operations of the routines and methods disclosed herein are not presented in any particular order and that performance of some or all of the operations in an alternative order, or orders, is possible and is contemplated. The operations have been presented in the demonstrated order for ease of description and illustration. Operations may be added, omitted, and/or performed simultaneously, without departing from the scope of the appended claims. The illustrated routines and methods can end at any time and need not be performed in their entireties.

Some or all operations of the methods, and/or substantially equivalent operations, can be performed by execution of computer-readable instructions included on a computer-readable storage media, as defined herein. The term "computer-readable instructions," and variants thereof, as used herein, is used expansively herein to include routines, applications, application modules, program modules, programs, program components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The logical operations described herein can be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations illustrated in the sequence and flow diagrams and described herein can be implemented, at least in part, by program components implementing the features disclosed herein and can be a dynamically linked library ("DLL"), a statically linked library, functionality produced by an API, a network service, a compiled program, an interpreted program, a script or any other executable set of instructions. Data can be stored in a data structure in one or more memory components. Data can be retrieved from the data structure by addressing links or references to the data structure.

The methods and routines described herein may be also implemented in many other ways. For example, the routines and methods may be implemented, at least in part, by a processor of another remote computer or a local circuit. In addition, one or more of the operations of the routines or methods may alternatively or additionally be implemented, at least in part, by a chipset working alone or in conjunction with other software modules.

The disclosure presented herein also encompasses the subject matter set forth in the following clauses:

Clause 1. A computer-implemented method, comprising: executing a network firewall between a virtualized environment and a processing system providing the virtualized environment; retrieving, by way of the network firewall, firewall policy from the processing system; receiving, at the network firewall, network traffic originating from or destined for a program component executing in the virtualized environment; and filtering the network traffic, by way of the network firewall, based on the firewall policy.

Clause 2. The computer-implemented method of clause 1, wherein the network traffic is received from a virtual network adapter in the virtualized environment, wherein the network traffic is destined for a network interface on the processing system, and wherein the virtual network adapter and the network interface are assigned a same network address.

Clause 3. The computer-implemented method of any of clauses 1 or 2, wherein the network traffic comprises loopback traffic generated by a guest operating system (OS) executing in the virtualized environment or a host OS executing on the processing system.

Clause 4. The computer-implemented method of any of clauses 1-3, wherein the network firewall is located in a hypervisor associated with the virtualized environment.

Clause 5. The computer-implemented method of any of clauses 1-4, wherein the network firewall is located in a flow steering engine executing on the processing system.

Clause 6. The computer-implemented method of any of clauses 1-5, wherein the firewall policy is shared with a second network firewall executing on the processing system, the second network firewall configured to filter network traffic originating from or destined for the processing system.

Clause 7. The computer-implemented method of any of clauses 1-6, wherein a unique identifier (ID) is assigned to the virtualized environment and wherein filtering the network traffic based on the firewall policy comprises filtering the network traffic based on the unique ID assigned to the virtualized environment.

Clause 8. The computer-implemented method of any of clauses 1-7, wherein the network traffic is received from a virtual network adapter in the virtualized environment, wherein a profile is assigned to a network interface on the processing system corresponding to the virtual network adapter, and wherein filtering the network traffic based on the firewall policy comprises filtering the network traffic based on the profile assigned to the network interface on the processing system.

Clause 9. A computer-readable storage medium having computer-executable instructions stored thereupon that, when executed by a processing system, cause the processing system to: provide a virtualized environment; and execute a network firewall located between the virtualized environment and the processing system, the network firewall configured to: retrieve firewall policy, receive network traffic originating from or destined for a program component executing in the virtualized environment, and filter the network traffic based on the firewall policy.

Clause 10. The computer-readable storage medium of clause 9, wherein the network traffic is received from a virtual network adapter in the virtualized environment, wherein the network traffic is destined for a network interface on the processing system, and wherein the virtual network adapter and the network interface are assigned a same network address.

Clause 11. The computer-readable storage medium of any of clauses 9 or 10, wherein the network traffic comprises loopback traffic generated by a guest operating system (OS) executing in the virtualized environment or a host OS executing on the processing system.

Clause 12. The computer-readable storage medium of any of clauses 9-11, wherein the network firewall is located in a hypervisor associated with the virtualized environment or in a flow steering engine executing on the processing system.

Clause 13. The computer-readable storage medium of any of clauses 9-12, wherein the firewall policy is shared with a second network firewall executing on the processing system, the second network firewall configured to filter network traffic originating from or destined for the processing system.

Clause 14. The computer-readable storage medium of any of clauses 9-13, wherein the network traffic is received from a program component executing in the virtualized environment, wherein the processing system is further configured to assign the program component a port number, and wherein filtering the network traffic based on the firewall policy comprises filtering the network traffic based on the port number assigned to the program component.

Clause 15. A processing system, comprising: a processor; and a computer-readable storage medium having computer-executable instructions stored thereupon that, when executed by the processing system, cause the processing system to: provide a virtualized environment; and execute a network firewall located between the virtualized environment and the processing system, the network firewall configured to: retrieve firewall policy, receive network traffic originating from or destined for a program component executing in the virtualized environment, and filter the network traffic based on the firewall policy.

Clause 16. The processing system of clause 15, wherein the network traffic is received from a virtual network adapter in the virtualized environment, wherein the network traffic is destined for a network interface on the processing system, and wherein the virtual network adapter and the network interface are assigned a same network address.

Clause 17. The processing system of any of clauses 15 or 16, wherein the network traffic comprises loopback traffic generated by a guest operating system (OS) executing in the virtualized environment or a host OS executing on the processing system.

Clause 18. The processing system of any of clauses 15-17, wherein the network firewall is located in a hypervisor associated with the virtualized environment or in a flow steering engine executing on the processing system.

Clause 19. The processing system of any of clauses 15-18, wherein the firewall policy is shared with a second network firewall executing on the processing system, the second network firewall configured to filter network traffic originating from or destined for the processing system.

Clause 20. The processing system of any of clauses 15-19, wherein the network traffic is received from a program component executing in the virtualized environment, wherein the processing system is further configured to assign the program component a port number, and wherein filtering the network traffic based on the firewall policy comprises filtering the network traffic based on the port number assigned to the program component.

Technologies for providing a network firewall between a virtualized environment and a host processing system have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
   executing a network firewall between a virtualized environment and a host providing the virtualized environment;
   retrieving, by way of the network firewall, at least a portion of a firewall policy shared with a host network firewall that filters first network traffic between a physical network and a host program component executing outside the virtualized environment;
   assigning a port number to a program component executing in the virtualized environment based on a port binding request made by the program component executing in the virtualized environment being forwarded to the host by a message forwarding software component in response to the message forwarding software component intercepting the port binding request;
   receiving, at the network firewall, second network traffic originating from or destined for the program component executing in the virtualized environment;
   filtering, via the port number assigned to the program component executing in the virtualized environment, the second network traffic, by way of the network firewall, based on the at least the portion of the firewall policy shared with the host network firewall; and
   providing the filtered second network traffic to a network destination or the program component.

2. The computer-implemented method of claim 1, wherein the second network traffic is received from a virtual network adapter in the virtualized environment, wherein the second network traffic is destined for a network interface on the host, and wherein the virtual network adapter and the network interface are assigned a same network address.

3. The computer-implemented method of claim 1, wherein the second network traffic comprises loopback traffic generated by a host operating system (OS) executing on the host or a guest OS executing in the virtualized environment.

4. The computer-implemented method of claim 1, wherein the network firewall is located in a hypervisor associated with the virtualized environment.

5. The computer-implemented method of claim 1, wherein the network firewall is located in a flow steering engine executing on the host.

6. The computer-implemented method of claim 1, wherein a unique identifier (ID) is assigned to the virtualized environment and wherein filtering the second network traffic based on the at least the portion of the firewall policy comprises filtering the second network traffic based on the unique ID assigned to the virtualized environment.

7. The computer-implemented method of claim 1, wherein the second network traffic is received from a virtual network adapter in the virtualized environment, wherein a profile is assigned to a physical network interface on the host corresponding to the virtual network adapter, and wherein filtering the second network traffic based on the at least the portion of the firewall policy comprises filtering the second network traffic based on the profile assigned to the physical network interface on the host.

8. The computer-implemented method of claim 7, wherein the profile assigned to the physical network interface on the host comprises a public profile that is assigned to the physical network interface when the physical network interface is connected to a public network.

9. The computer-implemented method of claim 7, wherein the profile assigned to the physical network interface on the host comprises a private profile that is assigned to the physical network interface when the physical network interface is connected to a partially trusted network.

10. The method of claim 1, wherein assigning the port number to the program component executing in the virtualized environment is further based on:
    determining that the port number is available in a data store that identifies port assignments for program components;
    in response to determining that the port number is available in the data store, updating the data store to indicate that the port number is assigned to the program component executing in the virtualized environment; and
    responding to the message forwarding software component indicating that the port number has been assigned to the program component executing in the virtualized environment based on the port binding request.

11. A computer-readable storage medium having computer-executable instructions stored thereupon that, when executed by a host, cause the host to:
    provide a virtualized environment; and
    execute a network firewall located between the virtualized environment and the host, the network firewall configured to:
      retrieve at least a portion of a firewall policy shared with a host network firewall that filters first network traffic between a physical network and a host program component executing outside the virtualized environment,
      assign a port number to a program component executing in the virtualized environment based on a port binding request made by the program component executing in the virtualized environment being forwarded to the host by a message forwarding software component in response to the message forwarding software component intercepting the port binding request;
      receive, at the network firewall, second network traffic originating from or destined for the program component executing in the virtualized environment;
      filter, via the port number assigned to the program component executing in the virtualized environment, the second network traffic, by way of the network firewall, based on the at least the portion of the firewall policy shared with the host network firewall; and
      provide the filtered second network traffic to a network destination or the program component.

12. The computer-readable storage medium of claim 11, wherein the second network traffic is received from a virtual network adapter in the virtualized environment, wherein the second network traffic is destined for a network interface on the host, and wherein the virtual network adapter and the network interface are assigned a same network address.

13. The computer-readable storage medium of claim 11, wherein the second network traffic comprises loopback traffic generated by a host operating system (OS) executing on the host or a guest OS executing in the virtualized environment.

14. The computer-readable storage medium of claim 11, wherein the network firewall is located in a hypervisor associated with the virtualized environment or in a flow steering engine executing on the host.

15. The computer-readable storage medium of claim 11, wherein the network firewall is further configured to assign the port number to the program component executing in the virtualized environment based on:
- determining that the port number is available in a data store that identifies port assignments for program components;
- in response to determining that the port number is available in the data store, updating the data store to indicate that the port number is assigned to the program component executing in the virtualized environment; and
- responding to the message forwarding software component indicating that the port number has been assigned to the program component executing in the virtualized environment based on the port binding request.

16. A host, comprising:
- a processor; and
- a computer-readable storage medium having computer-executable instructions stored thereupon that, when executed by the host, cause the host to:
  - provide a virtualized environment; and
  - execute a network firewall located between the virtualized environment and the host, the network firewall configured to:
    - retrieve at least a portion of a firewall policy shared with a host network firewall that filters first network traffic between a physical network and a host program component executing outside the virtualized environment,
    - assign a port number to a program component executing in the virtualized environment based on a port binding request made by the program component executing in the virtualized environment being forwarded to the host by a message forwarding software component in response to the message forwarding software component intercepting the port binding request;
    - receive, at the network firewall, second network traffic originating from or destined for the program component executing in the virtualized environment;
    - filter, via the port number assigned to the program component executing in the virtualized environment, the second network traffic, by way of the network firewall, based on the at least the portion of the firewall policy shared with the host network firewall; and
    - provide the filtered second network traffic to a network destination or the program component.

17. The host of claim 16, wherein the second network traffic is received from a virtual network adapter in the virtualized environment, wherein the second network traffic is destined for a network interface on the host, and wherein the virtual network adapter and the network interface are assigned a same network address.

18. The host of claim 16, wherein the second network traffic comprises loopback traffic generated by a host operating system (OS) executing on the host or a guest OS executing in the virtualized environment.

19. The host of claim 16, wherein the network firewall is located in a hypervisor associated with the virtualized environment or in a flow steering engine executing on the host.

20. The host of claim 16, wherein the network firewall is further configured to assign the port number to the program component executing in the virtualized environment based on:
- determining that the port number is available in a data store that identifies port assignments for program components;
- in response to determining that the port number is available in the data store, updating the data store to indicate that the port number is assigned to the program component executing in the virtualized environment; and
- responding to the message forwarding software component indicating that the port number has been assigned to the program component executing in the virtualized environment based on the port binding request.

\* \* \* \* \*